United States Patent Office 3,425,097
Patented Feb. 4, 1969

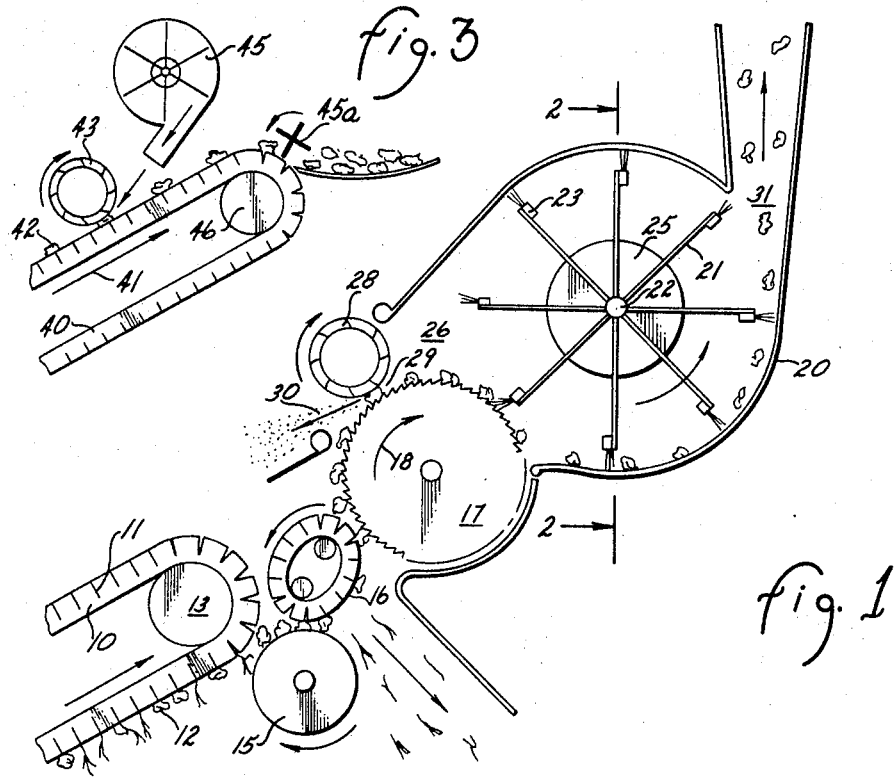
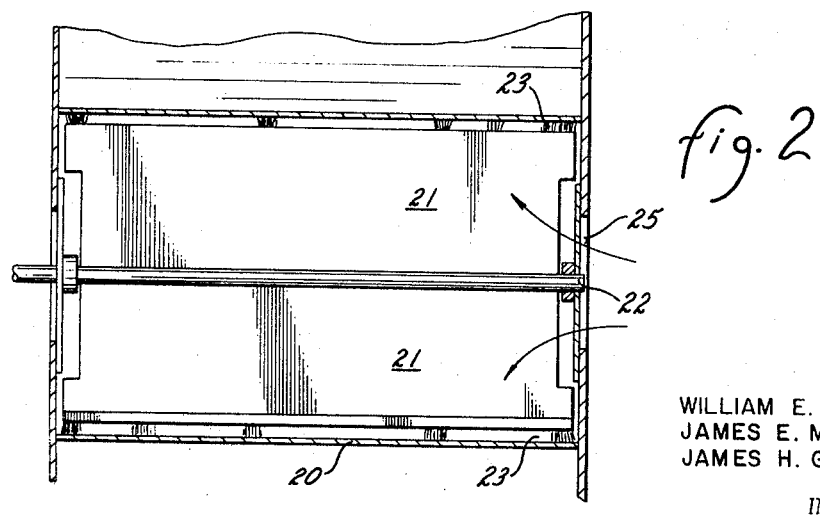

3,425,097
AIR WASH COTTON CLEANER AND TRANSPORTATION SYSTEM
William E. Rood, Jr., 235 E. Desert Park Lane 85020;
James E. McKinley, 6242 N. 34th Drive 85017; and
James H. Gray, 3411 E. Gold Dust 85028, all of
Phoenix, Ariz.
Filed May 25, 1966, Ser. No. 552,857
U.S. Cl. 19—203                        7 Claims
Int. Cl. D01b 3/00

ABSTRACT OF THE DISCLOSURE

This disclosure provides a cotton cleaning device including a rotating saw cylinder for transporting cotton, a doffer positioned adjacent the saw cylinder and rotating in the same direction as said saw cylinder to remove large trash from said saw cylinder and define with the periphery of said saw cylinder a flow path, and a centrifugal blower having brushes attached to the tips of rotating blades, the brushes removing cotton from the saw cylinder while air current created by the blower is directed through said flow path to air-wash the cotton on the saw cylinder of sand and fine trash found therein.

---

The present invention pertains to cotton cleaners and conveying systems, and more specifically, to a cotton cleaner incorporating a means for directing air over cotton as it is being transported within the cotton cleaner to remove particles of dirt and debris adhering thereto and to subsequently transport the cotton by air from the cleaner.

A variety of cotton cleaner designs are available for separating cotton from sticks, trash and other debris mixed with the cotton. Various forms of cotton heaters and cotton transfer means have been utilized in an attempt to render the cotton as clean as possible before ginning. Notwithstanding the ability of some cleaners to successfully remove debris and trash from the cotton, the problem still remains of the smaller, lighter weight particles of debris adhering to the fibers of the cotton as it passes through the cotton cleaner. In some instances this debris may be formed from leaves or sticks that have been crushed and appear as tiny flaked and dust-like particles entwined with the fibers of the cotton. Ordinary cotton cleaning techniques have been found generally ineffective in removing these particles from cotton.

It is therefore an object of the present invention to provide a cotton cleaner incorporating an air wash that effectively subjects the cotton to an air blast while it is being transported to remove particles of trash and debris adhering thereto.

It is also an object of the present invention to provide a cotton cleaner incorporating an air wash wherein a cotton transporting device such as a belt or rotating saw holds the cotton while air is forced over and past the cotton to remove trash.

It is still another object of the present invention to provide a cotton cleaner incorporating an air wash wherein air is forced over cotton as it is being transported in an air blast and wherein the air flow is confined to the vicinity of the cotton being transported.

It is another object of the present invention to provide a means to clean, doff and transport cotton using air as a means to accomplish all three functions.

These and other objects of the present invention will become apparent to those skilled in the art as the description thereof proceeds.

Briefly, in accordance with one embodiment of the present invention, a cotton transporting means such as a rotating saw is utilized to hold cotton for transportation in the cotton cleaner. A centrifugal blower is positioned adjacent to the rotating saw and includes an opening for directing air over the cotton as it is being transported on the saw. The air from the centrifugal blower passes over the saw, over and around the cotton, between the saw and a doffer placed adjacent the saw for striking the cotton to assist in the jarring and removal of fine particles embedded in the fibers of the cotton. The air impacting on the cotton assists in doffing, thus contributing to the effective cleaning action; further, the air is subsequently used to transport the cotton from the cleaner.

The present invention may more readily be described by reference to the accompanying drawings in which:

FIGURE 1 is an elevation view of a cotton cleaner constructed in accordance with the teachings of the present invention.

FIGURE 2 is a sectional view of a portion of FIGURE 1 taken along lines 2—2.

FIGURE 3 is a schematic illustration of another embodiment of the present invention.

Referring to FIGURE 1, a cotton cleaner is shown for retrieving cotton from the ground and for cleaning the cotton prior to ginning. Cotton is retrieved from the ground by a slotted belt 10 of the type described and claimed in Patent No. 2,670,584. The belt includes a plurality of transverse slots 11 which remain closed and grasp cotton 12 until the belt passes over a pulley 13. As the belt passes over the pulley, the slots open and release the cotton grasped thereby. The cotton is released onto a roll 15 which supports the cotton while it is being grasped by a second belt 16. The transfer from belt to belt results in a cleaning action but may nevertheless leave certain particles of debris, especially fine particles, adhering to the fibers of the cotton. Accordingly, a transporting means such as a rotating saw 17 is positioned adjacent the belt 16 and is rotated in the direction indicated by the arrow 18. As the saw rotates, the teeth thereof snag the cotton being transported by the belt 16 and removes the cotton as the slots in the belt 16 open. The teeth of the saw 17 hold the cotton and transport the latter upwardly and around the saw until it enters a position wherein high-velocity air may be used to remove particles of debris.

A housing 20 is provided for enclosing a means for generating air under pressure (in the example chosen for illustration, a centrifugal blower). A plurality of blades 21 extend radially from a shaft 22 and each carries a brush 23 attached to the tip thereof. The blades 21 and brushes 23 substantially fill the housing 20 so that when the latter are rotated, a centrifugal force is imparted to the air entrapped between the blades. A first opening 25 positioned axially of said shaft 22 permits air to enter, axially of the shaft, into the interior of the housing 20. A second opening 26 permits the air centrifugally thrown by the blades to escape from the housing past the cotton being transported on the rotating saw 17. A doffer 28 is mounted in the second opening 26 and is positioned adjacent to the saw 17 to define an air space 29 therebetween for directing air between the doffer 28 and the saw 17 past the cotton being carried by the latter. The air passes over, around, and under (since the cotton is carried on the tips of the saw teeth) the cotton. The small particles of adhering debris are thus blown in a direction indicated by the arrow 30 and may be appropriately disposed of. The air striking the cotton acts as an auxiliary doffer since the impact tends to jar small adhering particles from the cotton.

As the brushes 23 pass over and contact the surface of the rotating saws 17, the cotton being carried by the saws is removed and swept upwardly and outwardly (by centrifugal force) into the blower formed by the housing 20 and the rotating blades 21. A third opening 31 is provided in the housing 20 and permits the escape of the cotton removed from the saws 17 through the expediency of the air blowing the latter upwardly and out of the housing 20. The cotton is thus transported from the cleaner by means of centrifugal force and by the air generated by the rotating blades supporting the brushes.

Referring to FIGURE 2, the opening 25, the shaft 22, the blades 21 and the brushes 23 may be seen in front elevational view. The width of the blades may be chosen in accordance with whatever design criteria dictate the total number of rotating saws to be utilized in a particular cotton cleaner. Similiarly, the size of the opening 25 may also be chosen to correspond to the desired air flow rate and pressure desired in the cotton cleaner. The embodiment shown in FIGURES 1 and 2 facilitates the utilization of a saw-cleaning brush as a centrifugal blower, and also permits an increased air velocity flow over the cotton carried by the saw 17. The latter is provided by placing the doffer 28 in a position such that the doffer and the saw 17 form a venturi, thereby rapidly increasing the velocity of the air flowing therebetween.

Referring to FIGURE 3, another embodiment of the present invention is shown wherein the transporting means comprises a slotted belt 40 moving in the direction indicated by 41. As the cotton 42 held by the belt 40 is being transported, a doffer 43 is rotated and strikes the cotton in a manner similar to the doffer 28 in FIGURE 1. A centrifugal blower 45 is provided and provides air directed at the space between the doffer 43 and the belt 40. The space thus formed provides a path for the air having a reduced cross-sectional area to form a venturi, increasing the velocity of the air as it passes over and around the cotton being carried on the belt. The resulting cleaning action is similar to that shown in FIGURE 1. The cotton may be removed from the belt in any convenient manner such as by a roating paddle 45a positioned to strike the cotton as it is released by the belt 40 when the latter passes over a pulley 46.

The present invention may be modified in a great many details without departing from the spirit and scope thereof; for example, the means for transporting the cotton or for doffing may be varied considerably. The means for directing the air onto the cotton is not critical although the embodiments chosen for illustraation are unusually efficient in obtaining air-washing action of the cotton being transported through the cleaner. It is therefore intended that the present invention be limited only by the scope of the claims appended hereto.

We claim:

1. In a cotton cleaner, the combination comprising: transporting means including a saw for holding cotton for transportation in said cotton cleaner; a source of air under pressure; means defining a path for the flow of air from said source in a direction opposite to the direction of transportation of said cotton, said path including cotton being transported by said transporting means; said source of air comprising a centrifugal blower having brushes attached to the tips of rotating blades, said brushes removing cotton from said saw as said blades rotate.

2. In a cotton cleaner, the combination comprising: transporting means including a rotating saw for holding cotton for transportation in said cotton cleaner; a source of air under pressure; means defining a path for the flow of air from said source in a direction opposite to the direction of transportation of said cotton, said path including cotton being transported by said transporting means; said means defining a path comprising said rotating saw and a doffer positioned adjacent said saw to permit air to flow therebetween and over and past cotton being transported by said saw.

3. In a cotton cleaner, the combination comprising: transporting means for transporting cotton; a rotating brush mounted on a shaft and positioned proximate said transporting means, said brush contacting the surface of said transporting means to remove cotton being transported thereby; said brush including a plurality of vanes extending radially of said shaft; a housing enclosing said vanes including an opening at an end of said shaft to admit air therethrough and to permit air to be directed radially of said shaft by the centrifugal force imparted thereto by aid vanes; and a second opening in said housing adjacent said transporting means to permit said rotating brush to contact said transporting means and to direct air from said rotating brush over said transporting means.

4. The combination set forth in claim 3 wherein said transporting means comprises a rotating saw.

5. The combination set forth in claim 3 including a third opening in said housing for directing air and cotton carried thereby away from said rotating brush.

6. The combination set forth in claim 4 including a third opening in said housing for directing air and cotton carried thereby away from said rotating brush.

7. The combination set forth in claim 6 including a doffer mounted in said second opening and positioned adjacent said saw to define an air space therebetween for striking cotton carried by said saw, said air space defining an air passageway for directing air from said rotating brush over cotton carried by said saw.

References Cited

UNITED STATES PATENTS

| | | | |
|---|---|---|---|
| 395,640 | 12/1888 | Brott | 19—58 |
| 1,401,439 | 12/1921 | Pettit | 19—80 |
| 2,848,754 | 8/1958 | Mayer et al. | 19—203 |
| 3,086,254 | 4/1963 | Mitchell et al. | 19—203 |
| 3,172,165 | 3/1965 | Helm | 19—203 |
| 379,760 | 3/1888 | Brott | 19—55 |
| 1,222,733 | 4/1917 | Calderwood | 19—106 |
| 1,640,420 | 8/1927 | Mitchell | 19—36 |

MERVIN STEIN, *Primary Examiner.*

IRA C. WADDEY, JR., *Assistant Examiner.*

U.S. Cl. X.R.

19—204